United States Patent
Momchilov et al.

(10) Patent No.: US 10,924,545 B2
(45) Date of Patent: Feb. 16, 2021

(54) COMPUTER SYSTEM PROVIDING MIRRORED SAAS APPLICATION SESSIONS AND RELATED METHODS

(71) Applicant: CITRIX SYSTEMS, INC., Fort Lauderdale, FL (US)

(72) Inventors: Georgy Momchilov, Fort Lauderdale, FL (US); Jeroen Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 181 days.

(21) Appl. No.: 16/156,267

(22) Filed: Oct. 10, 2018

(65) Prior Publication Data

US 2020/0120159 A1 Apr. 16, 2020

(51) Int. Cl.
*G06F 15/16* (2006.01)
*H04L 29/08* (2006.01)
*H04L 29/06* (2006.01)

(52) U.S. Cl.
CPC .......... *H04L 67/1095* (2013.01); *H04L 67/02* (2013.01); *H04L 67/141* (2013.01); *H04L 67/42* (2013.01)

(58) Field of Classification Search
CPC .............. H04L 67/1095; H04L 67/02; G06F 2009/4557; G06F 2009/45595; G06F 9/461; G06F 9/4856
USPC ........................................................ 709/203
See application file for complete search history.

(56) References Cited

U.S. PATENT DOCUMENTS

| | | |
|---|---|---|
| 7,526,559 B1 | 4/2009 | Phillips |
| 8,392,617 B1 | 3/2013 | Weber et al. |
| 8,850,010 B1 | 9/2014 | Qureshi |
| 9,176,744 B2 | 11/2015 | Lee |
| 9,538,345 B2 | 1/2017 | Sah et al. |
| 2002/0062369 A1 | 5/2002 | von Klopp et al. |
| 2003/0105805 A1* | 6/2003 | Jorgenson ........... H04L 67/1095 709/203 |
| 2005/0091572 A1 | 4/2005 | Gavrilescu et al. |
| 2007/0027896 A1* | 2/2007 | Newport ............. H04L 67/1095 |
| 2010/0306642 A1 | 12/2010 | Lowet et al. |
| 2012/0096076 A1* | 4/2012 | Chan ..................... G06F 9/4856 709/203 |

(Continued)

FOREIGN PATENT DOCUMENTS

WO    WO0186980    11/2001

OTHER PUBLICATIONS

Song et al. "Browser State Repository Service" Lecture Notes In Computer Science: Jan. 1, 2002; pp. 253-266.

(Continued)

*Primary Examiner* — Hee Soo Kim
(74) *Attorney, Agent, or Firm* — Allen, Dyer, Doppelt + Gilchrist, PA

(57) ABSTRACT

A computer system may include a client computing device configured to run a first Software as a Service (SaaS) application session from a SaaS server within a first browser. A server may cooperate with the at least one client computing device to run a second SaaS application session within a second browser mirroring a state of the first SaaS application session, and forward data traffic generated by the first SaaS application session to the SaaS server while blocking traffic generated by the second SaaS application session from passing to the SaaS server.

20 Claims, 12 Drawing Sheets

(56) References Cited

U.S. PATENT DOCUMENTS

| | | |
|---|---|---|
| 2013/0054734 A1 | 2/2013 | Bond et al. |
| 2013/0067020 A1 | 3/2013 | German et al. |
| 2013/0159709 A1 | 6/2013 | Ivory et al. |
| 2014/0032635 A1* | 1/2014 | Pimmel ............... H04M 1/7253 709/203 |
| 2014/0053054 A1* | 2/2014 | Shen ................... G06F 16/9577 715/234 |
| 2014/0317081 A1 | 10/2014 | Dubois-Ferriere et al. |
| 2014/0351370 A1 | 11/2014 | Ashley et al. |
| 2015/0296027 A1* | 10/2015 | Bak ..................... H04L 67/2804 709/202 |
| 2016/0182627 A1 | 6/2016 | Navanageri et al. |
| 2016/0350391 A1 | 12/2016 | Vijayan et al. |
| 2017/0097973 A1* | 4/2017 | Iannaccone ......... H04L 67/1095 |
| 2017/0134248 A1 | 5/2017 | Smith et al. |
| 2017/0339250 A1 | 11/2017 | Momchilov et al. |
| 2018/0021684 A1 | 1/2018 | Benedetto |
| 2018/0343179 A1* | 11/2018 | VanBlon ................ H04L 43/08 |
| 2019/0342400 A1 | 11/2019 | Van Rotterdam et al. |
| 2020/0092291 A1* | 3/2020 | Vempati .................. H04L 63/08 |

OTHER PUBLICATIONS

Christopher Neasbitt et al: "ClickMiner", Computer and Communications Security, ACM, 2 Penn Plaza, Suite 701 New York NY 10121-0701 US, Nov. 3, 2014 (Nov. 3, 2014), pp. 1244-1255.

* cited by examiner

COMPUTER SYSTEM PROVIDING MIRRORED SAAS APPLICATION SESSIONS AND RELATED METHODS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" and/or virtual applications may be stored in and administered by a remote server, rather than in the local storage of the client computing device.

Web applications are another approach to remotely provisioning and providing applications. One example web application approach for software licensing and delivery is Software as a Service (SaaS). This is a cloud computing approach to software delivery by which software applications are centrally hosted in the cloud and provided on a subscription basis to users. SaaS applications are typically accessed on client devices with a thin client via a browser program, and may in some instances be provided through a virtual computing session.

SUMMARY

A computer system may include a client computing device configured to run a first Software as a Service (SaaS) application session from a SaaS server within a first browser. A server may cooperate with the at least one client computing device to run a second SaaS application session within a second browser mirroring a state of the first SaaS application session, and forward data traffic generated by the first SaaS application session to the SaaS server while blocking traffic generated by the second SaaS application session from passing to the SaaS server.

In an example embodiment, the client computing device may be a first client computing device running the first SaaS application session within the first browser. Furthermore, the system may also include a second client computing device different than the first client computing device cooperating with the server to run the second SaaS application within the second browser.

In accordance with an example implementation, the server may be further configured to store a series of browser commands executed by the first browser in the first SaaS application session, and initiate the second SaaS application session within the second browser based upon the stored series of browser commands to replicate the state of the first SaaS application session. Moreover, the server may be further configured to cease storing browser commands executed by the first browser once the second SaaS application session has been initiated, and begin executing the same browser commands as the first SaaS application session in parallel in the second SaaS application session to maintain the same state in the second SaaS application session as the first SaaS application session, for example. Moreover, in an example implementation, the server may cause the second browser to repeat execution of the series of stored browser commands sequentially to initiate the second SaaS application session.

In one example implementation, the server may be configured to designate network traffic from the first and second browsers with a joint session identifier (ID). By way of example, at least one of the first and second browsers may comprise an embedded browser or hosted browser.

A related method may include running a first SaaS application session from a SaaS server within a first browser at a client computing device. The method may further include using a server to run a second SaaS application session within a second browser mirroring a state of the first SaaS application session, and forward data traffic generated by the first SaaS application session to the SaaS server while blocking traffic generated by the second SaaS application session from passing to the SaaS server.

A related non-transitory computer-readable medium may have computer-executable steps for causing a server to perform steps including cooperating with a client computing device to run a first SaaS application session from a SaaS server within a first browser at a client computing device, and running a second SaaS application session within a second browser mirroring a state of the first SaaS application session. The steps may further include forwarding data traffic generated by the first SaaS application session to the SaaS server while blocking traffic generated by the second SaaS application session from passing to the SaaS server.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and prime notation may be used to indicate similar elements in different embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
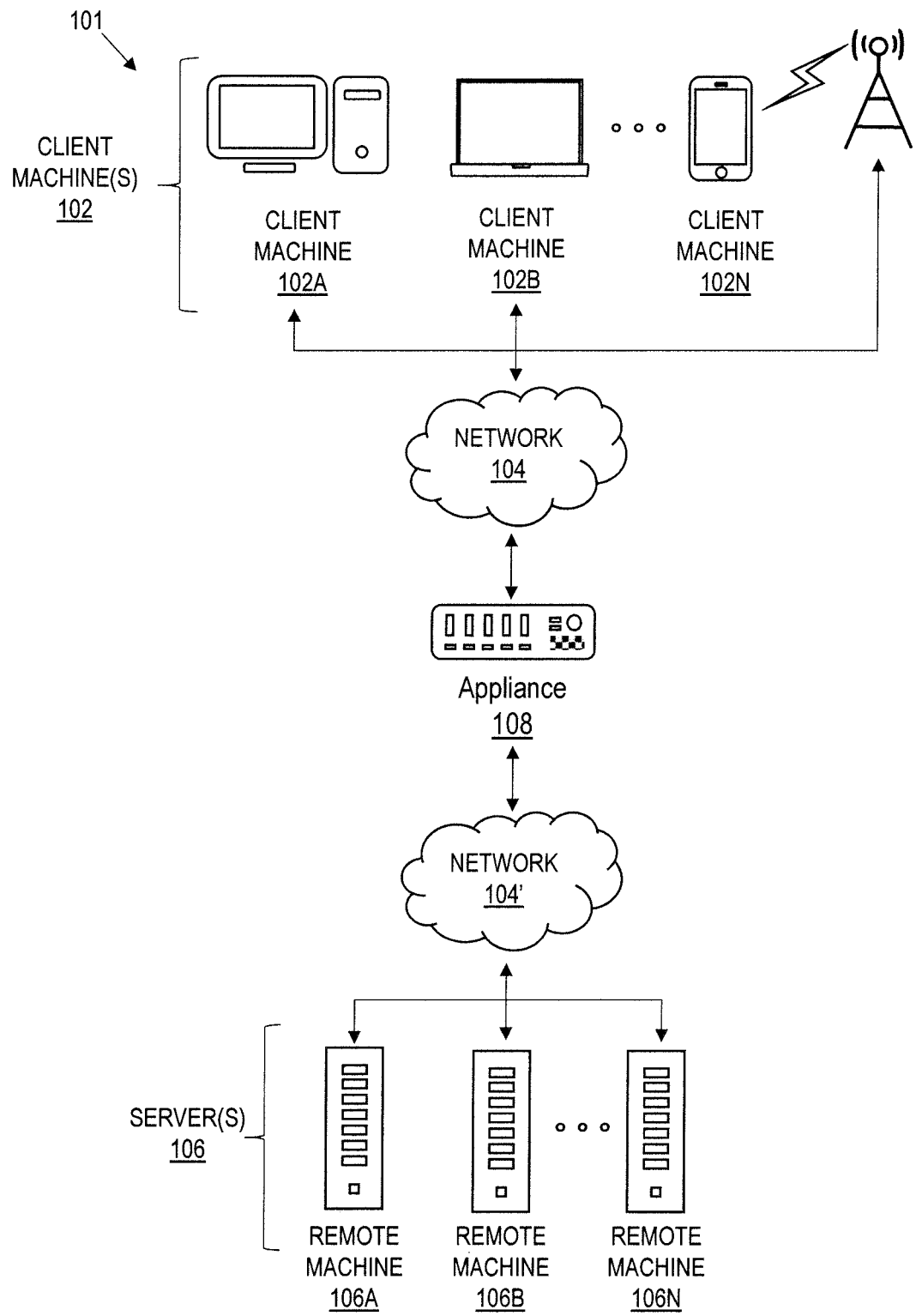
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
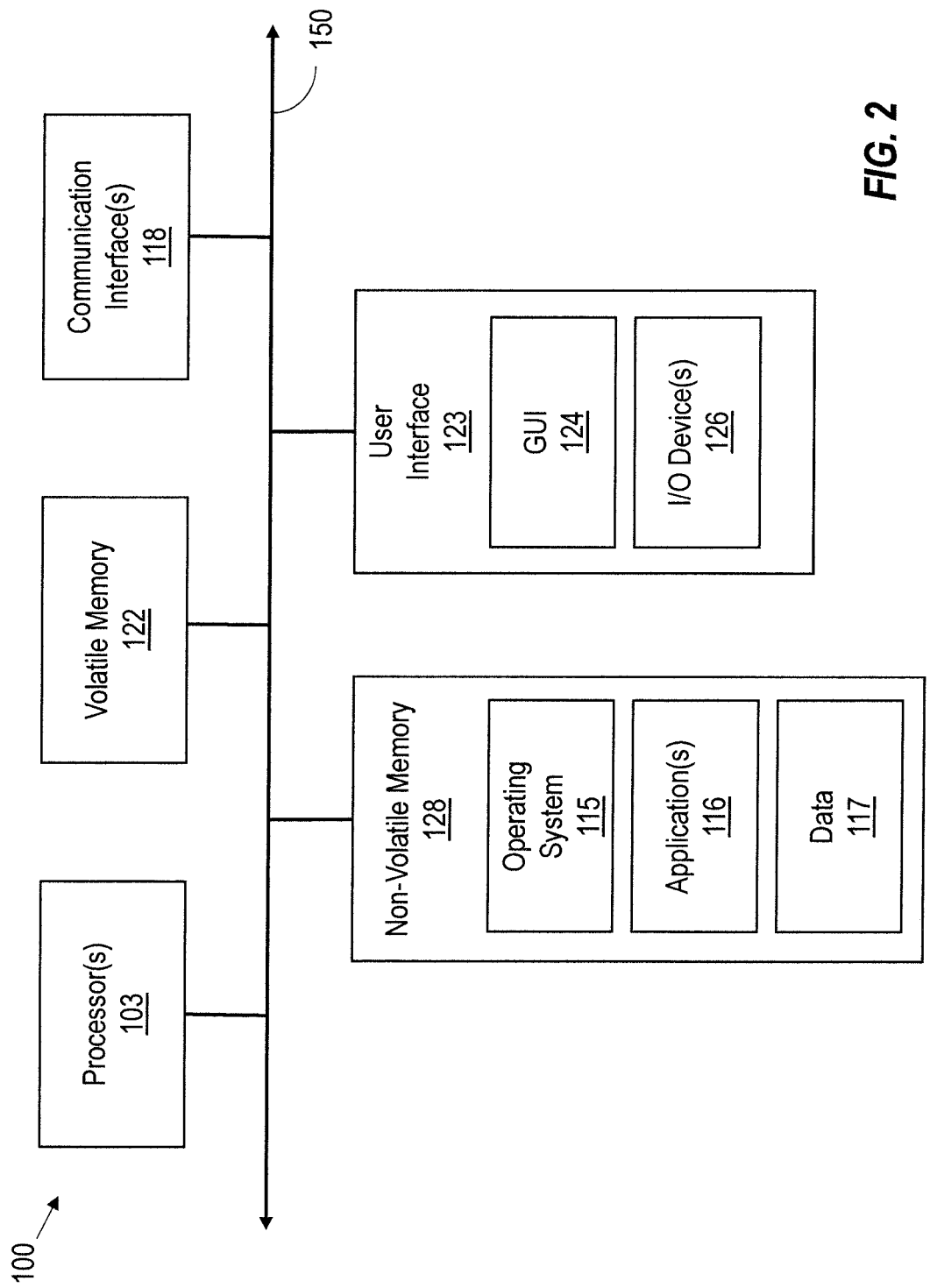
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
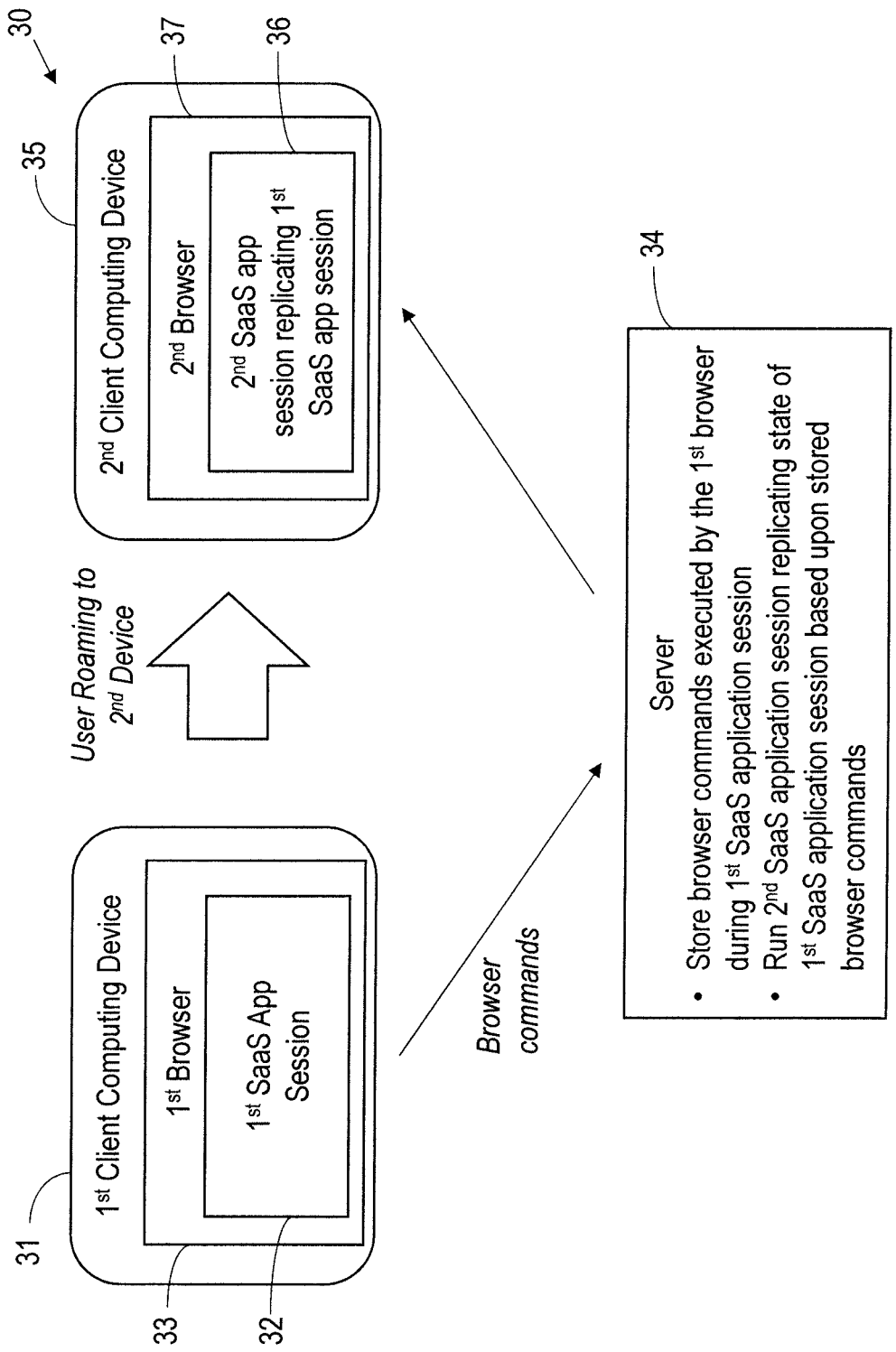
FIG. 3 is a block diagram of a computing system providing Software as a Service (SaaS) application session roaming between browsers on difference client computing devices in accordance with an example implementation.
Figure 5:
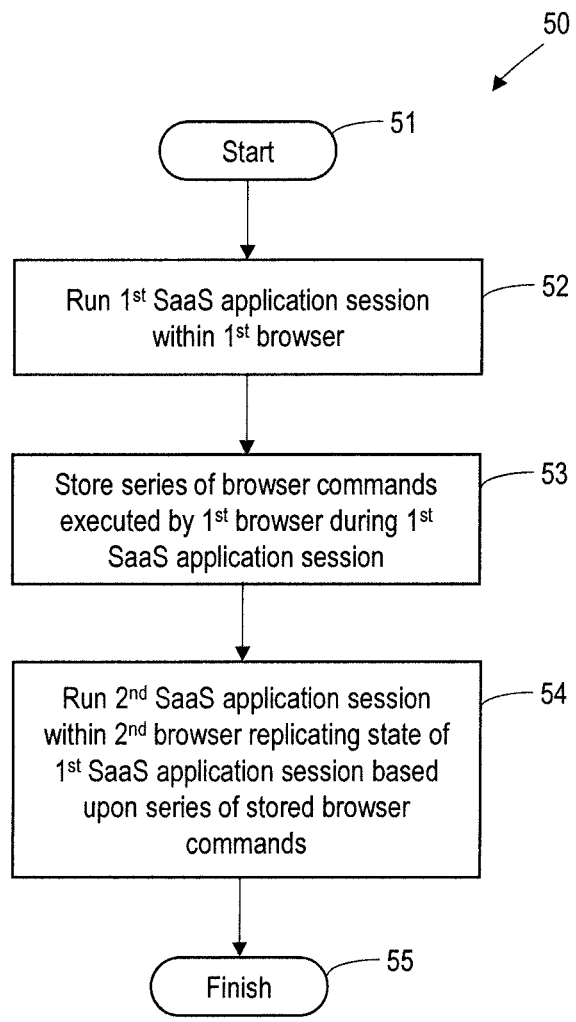
FIGS. 5 and 6A-6B are flow diagrams illustrating method aspects associated with the systems of FIGS. 3 and 4.

Turning now to FIG. 3 and the flow diagram 50 of FIG. 5, a computer system 30 which advantageously provides Software as a Service (SaaS) migration features between different browsers and associated method aspects are first described. By way of background, currently users are required to execute repetitive steps to rebuild context every time they open a new SaaS application session. For example, in the Citrix Workday SaaS application a user could start from the home screen, then transition to a specific task screen and start working on a task. By way of example, a user may start with the home screen, then go to My Performance, Add/Change Priorities, Individual Priorities, browse through a long list of existing priories, select a specific priority, Edit, start modifying some text or input fields, etc.

If a user pauses his or her work and roams to a new device, then the user has to not only authenticate and launch the SaaS application session but also execute the same potentially long sequence of steps to rebuild the context to where they previously left off. In addition, the user has to remember where they left off, which may sometimes be challenging if roaming occurred over a long period of time.

The system 30 may automatically preserve and recreate the context or state of SaaS applications during various forms of session roaming or migration to advantageously improve productivity and user experience (UX) with SaaS applications. More particularly, beginning at Block 51, a first client computing device 31 (such as those discussed above) is configured to run a first SaaS application session 32 within a first browser 33, at Block 52. The browser 33 may be one of various types, including a local browser, managed or embedded browser, or hosted browser, for example.

Generally speaking, an embedded browser is a browser embedded within a native application or agent. For example, Citrix Receiver and Citrix Workspace App are programs that are installed on client devices and provide an embedded browser. In some cases, embedded browsers may be managed browsers which provide access to the Internet and/or enterprise resources in accordance with certain rules and permission (DLP) levels. For example, Citrix XenMobile is software that provides MOM and MAM capabilities, including micro-VPN technology allowing VPN access on a per-application basis. A hosted browser is run remotely on a cloud or network server, such as in a virtual computing session, and displayed locally at the client computing device. For example, such hosted browsers are provided through the Citrix Secure Browser Service.

Furthermore, a server 34 (such as those described above) cooperates with the client computing device 31 to store a series of browser commands executed by the first browser 33 during the first SaaS application session 32, at Block 53. In this regard, the server 34 may be a network server, a virtualization server providing virtual computing sessions for the first client computing device 31, and/or a cloud based server. In one example implementation, the server 34 may be part of a secure file sharing system such as ShareFile from Citrix Systems, although other file sharing systems may also be used. When it is time for the user to roam or migrate to a second client computing device 35, a second SaaS application session 36 may be run within a second browser 37 on the second client computing device replicating a state of the first SaaS application session based upon the series of stored browser commands maintained by the server 34, at Block 54, which concludes the method illustrated in FIG. 5 (Block 55).

Figure 4:
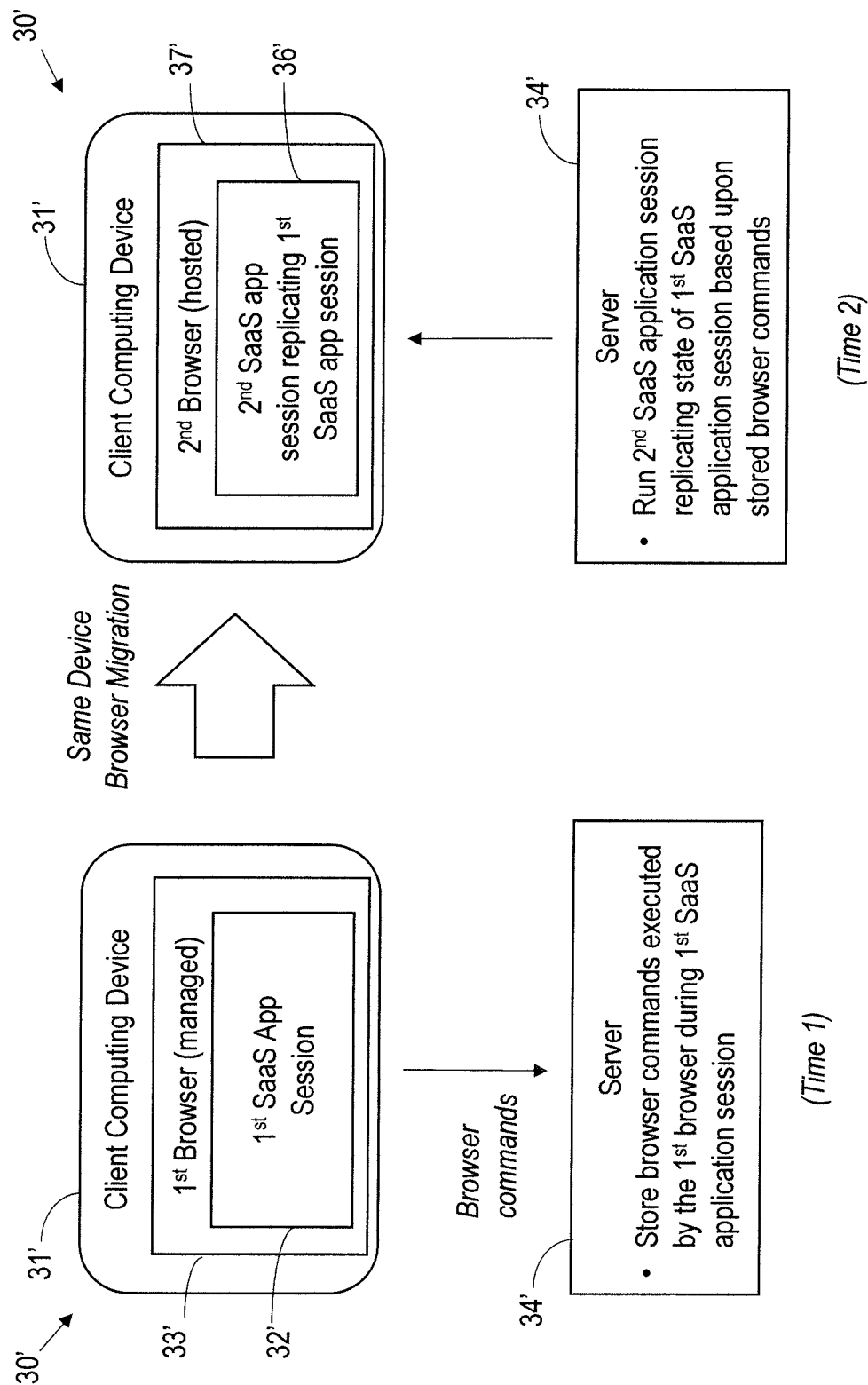
FIG. 4 is a block diagram of another example implementation of the computing system of FIG. 3 providing SaaS application roaming features between different browsers on a same client computing device.

Referring now to FIG. 4, in another form of SaaS roaming, an automatic transition may occur between a SaaS session in a local browser (e.g., one embedded or managed by Citrix Receiver or the Citrix Workspace App) and a new session in a hosted browser (e.g., the Citrix Secure Browser), or vice-versa. This transition may occur either at the start of the SaaS application session or dynamically depending on UX, performance, security or other considerations. In this use case, the client computing device 31' of the system 30' runs the first SaaS application session 32' within the first browser 33' at a first time, and the collected series of browser commands executed by the first browser are stored with the server 34' as described above. When it is time for migration from the first browser 33' (which is a managed browser in this example) to a second browser 37' (a hosted browser in this example), the client computing device 31' and server 34' cooperate to run a new session 36' of the same SaaS application based upon the stored series of browser commands, yet while still retaining the same state of the first SaaS application session as noted above.

Figure 6A:
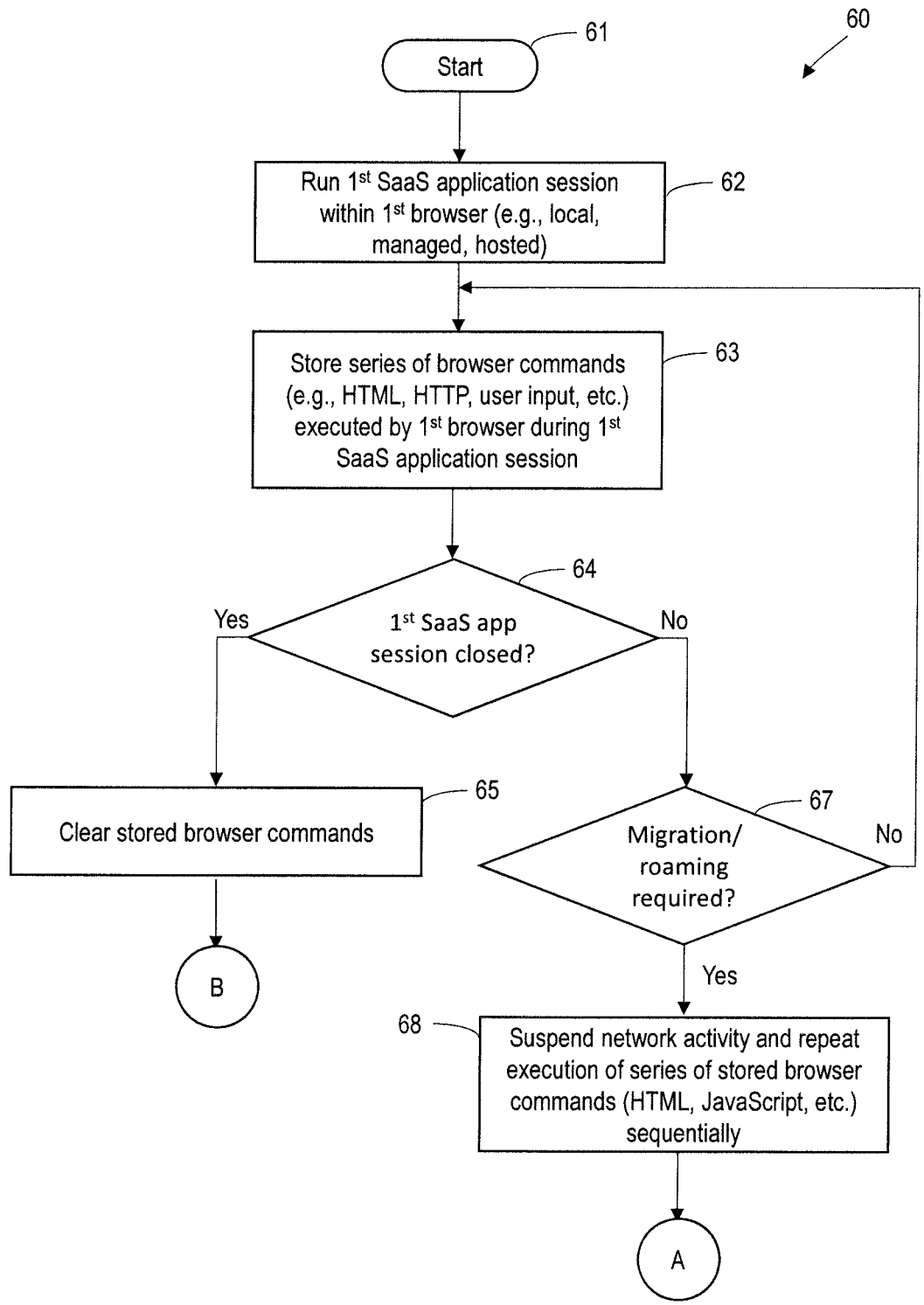
Figure 6B:
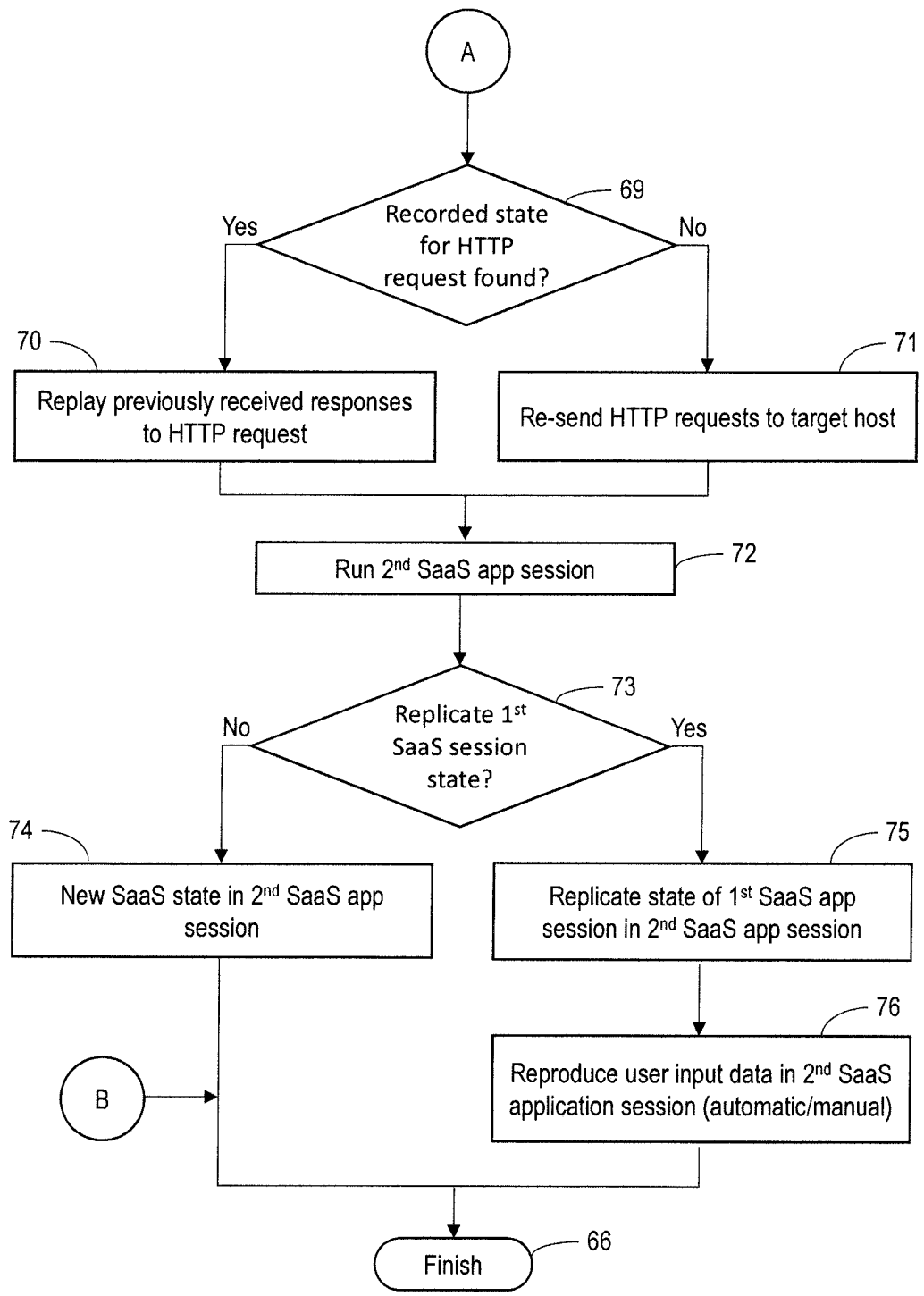

The foregoing will be further understood with reference to the flow diagram 60 of FIGS. 6A-6B and various example use cases. For purposes of this discussion, it will be assumed that the user is migrating between different client devices (as in FIG. 3) unless otherwise noted. However, it will be understood that these same actions or steps may apply to browser migration on the same client device (as illustrated in FIG. 4). With respect to the first SaaS application session instance 32 on the first client device 31, beginning at Block 61, a user authenticates and launches the desired SaaS application in the first browser 33 (Block 62), which in this example is a managed browser such as the Chromium Browser Engine in Citrix Receiver or Citrix Workspace App. The first managed browser 33 applies browser hooks, stubs or proxy elements, for example, to perform various actions. These may include recording user actions in the managed browser and loaded HTML pages. More particularly, information such as action type, position, direction relative to browser controls or HTML tags, as well as relative time of action may be captured, in addition to other pertinent information.

Capturing of the browser commands may further include recording HTTP requests and responses in the first managed browser 33. By way of example, these may include the HTTP method, URI, host, path, body and headers, as well as relative time of requests and responses. In still other examples, these may involve REST API calls, JavaScript commands, etc.

In some embodiments, the recorded state captured in the browser commands may be stored in a serialized format to be sequentially replayed when creating the second SaaS application session 36 having the same state as the first SaaS application session 32. The serialized format may encompass user actions, HTTP requests and responses, SaaS application ID, etc. In accordance with one example, this may be accomplished by serializing the recorded state in JSON, although other approaches may also be used which allow the information to be later shared and replayed sequentially. The serialized recorded state may be stored in a secure shared location, such as the server 34, at Block 63. For example, this may be done using Citrix ShareFile in the context of the authenticated user, although other suitable approaches may also be used.

In some cases, a user may close the first SaaS application session 32, at Block 64. For example, the user may close the managed browser 33 tab hosting the SaaS application, or close the program running the managed browser (e.g., Citrix Receiver or Workspace App). Other intuitive forms of "closing" or discarding work in an SaaS application may also exist. When this occurs, the series of browser commands may then be cleared or erased from the server 34 and/or local storage (Block 65), concluding the illustrated method (Block 66).

When it is time for the user to roam from the first device 31 to the second device 35, at Block 67, the user may authenticate and launch the second SaaS app session 36 of the same SaaS application within the second browser 37. In accordance with one example implementation, a second instance of Citrix Receiver or Citrix Workspace App may be invoked including the managed browser 37. A transition may also occur between a SaaS session in a local browser (e.g., one embedded or managed by Citrix Receiver or Citrix Workspace App) and a new session in a hosted browser (such as the Citrix Secure Browser), or vice versa. As noted above, this may be between different devices, or different browsers on the same client device. In some embodiments, to provide enhanced UX, authentication tokens may also be shared for cross-device single sign-on (SSO), although this need not be done in all embodiments.

With respect to the second SaaS application session instance 36 on the second device 35, the second browser 37 applies the appropriate browser hooks, stubs or proxy elements to recreate the state of the first SaaS application session 32, at Block 68. More particularly, this may include retrieving the serialized recorded state based on a SaaS application ID. In accordance with one example, this state data may be retrieved from Citrix ShareFile in the context of the authenticated user. Moreover, network activity may optionally be suspended for the second computing device 35 while the prior browser commands are re-executed to recreate the state of the first SaaS application session 32. In particular, the user actions may be replayed or executed sequentially. Where the user simply interacts with browser controls or local HTML, e.g., scroll text or selecting a checkbox, no further action is required and the local user agent at the client device may handle execution of such updates.

On the other hand, if the user action within the first SaaS application session 32 triggers a more complex process, such as an HTTP request, at Block 69, then various options exist when replaying such requests. First, the server 34 (or local agent such as Citrix Receiver in some embodiments) may search the recorded state for a matching request. By way of example, request matching may be performed based on an HTTP method, URI, host, path, body and headers, etc., or a combination of these approaches. In some cases, it is possible that multiple versions of the same request may be found, in which case a relative timing of the requests may be used to select the appropriate response. If a matching HTTP request is found, the response from the recorded state may be played, instead of forwarding the request to the target host, at Block 70.

If no recorded state for an HTTP request exists, then the request may be re-sent to the appropriate target host, at Block 71. More particularly, a request may be allowed to go to the target host by temporarily allowing network activity until a response comes back. Another instance where this may be appropriate is where a change of response has occurred. More particularly, if Data Loss Prevention (DLP) policies on the first client computing device 31 resulted in denied access but DLP policies on the second client computing device 35 would allow such access, then that same request may then be permitted to go to the target host when initiating the second SaaS application session 36.

Optionally, for relatively closely timed requests, servicing responses may be serialized based on an original relative timing of the browser commands. This may be done to avoid potential issues with different user agents and multi-threaded page rendering, where certain sequences of responses may be expected. However, this may result in a proportionately timed delay in the replay of responses.

Once all the recorded user actions (i.e., browser commands) are exhausted, network activity may be resumed for the second client computing device 35 with normal HTTP handling to target hosts. The state of the first SaaS application session 32 is then re-created in the second SaaS application session 36, and the further recording of browser commands from the second browser 37 to add to the SaaS application state may be performed just like in the first SaaS session instance 32. That is, the process may continue to migrate to another browser on the same device, or to another browser on a different client computing device as described above and may continue indefinitely if desired.

In some embodiments, the user may be given a choice as to whether he or she wishes to reproduce the first SaaS application session state. For example, the user may be given a choice right after launching the second SaaS application, at Blocks 72-73, between starting fresh (Block 74) or continuing where they left off (i.e., from the first SaaS application session state), at Block 75. In the former case, the recorded state stored at the server 34 may be reset.

In some example implementations, data such as metadata identifying HTML pages, their tags and user input (e.g., text) into specific fields may be recorded during the first SaaS application session 32. Then, in the second SaaS application session instance 36, and while the user is in the respective context (e.g., filling out the same or similar form, etc.), the previously-recorded user input data may be replayed either automatically or by suggesting to the user to replay it, at Block 76. For example, this may include pasting text into fields, or presenting a "clipboard blob" and allowing the user to manually copy and paste from it. As such, the user need not be required to explicitly copy and paste information (in the fully automatic implementation), or at least the user need not be required to proactively copy it prior to roaming (in the suggestive implementation). In some embodiments, such input data may be recorded and migrated without recording all of the other browser commands noted above (e.g., HTML/HTTP) to recreate the state of user input data by itself, to thereby provide a partial state migration from the first SaaS application session 32. Stated alternatively, only part of the SaaS application state would be migrated in such an embodiment, while the user would "manually" rebuild the rest of the context, if desired.

The above-described approach advantageously provides live state migration for SaaS applications in different forms of roaming. For example, these include roaming device-to-device between client endpoints, as well as roaming between a local client device browser and a hosted Secure Browser service. For example, in one example use case this may be orchestrated by Citrix Receiver or the Citrix Workspace App with an embedded browser during local versus remote fallback to help balance the needs of local UX, performance, security, etc. The above-described approach may accordingly improve productivity and UX with SaaS applications in various forms of SaaS application session roaming by helping to avoid execution of repetitive steps to rebuild context in each new SaaS application session.

Figure 7:
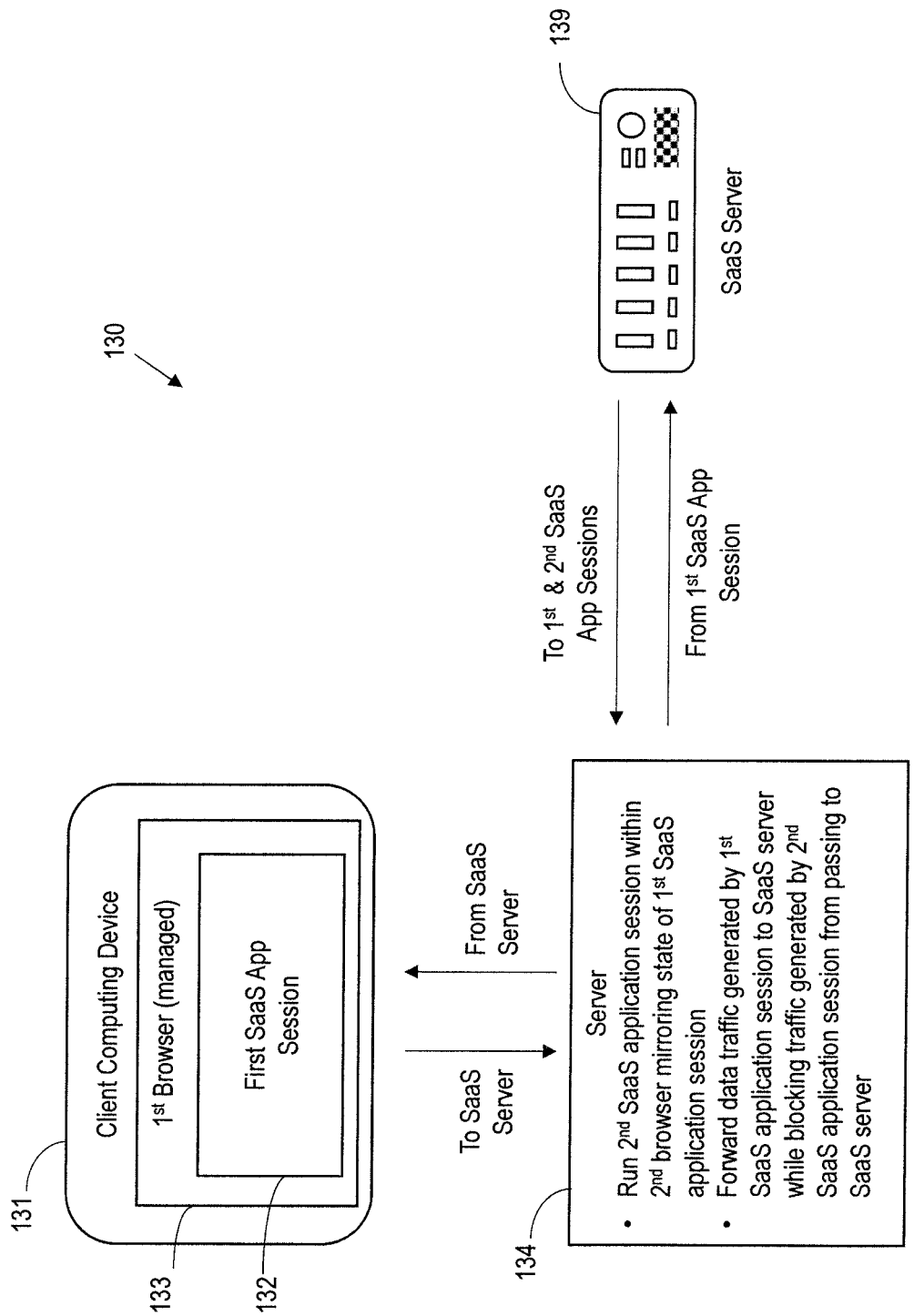
FIG. 7 is schematic block diagram of computing system in accordance with another example embodiment in which a second SaaS application session is run in parallel with, and mirrors the state of, a first SaaS application session.
Figure 8:
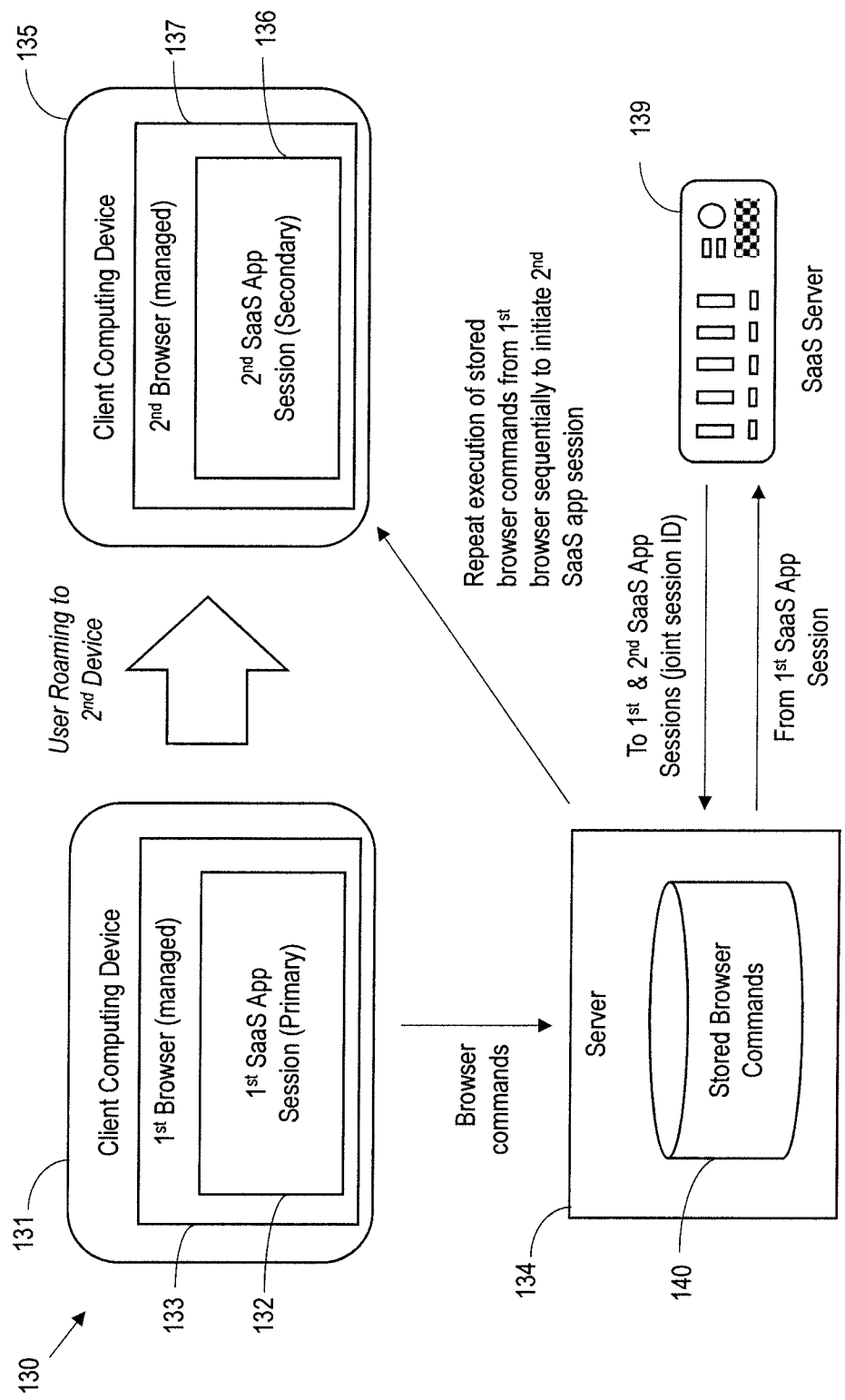
FIGS. 8 and 9 are a series of schematic block diagrams illustrating an example implementation of the system of FIG. 7 in which a parallel SaaS application session is used for roaming from a first client computing device to a second client computing device.
Figure 9:
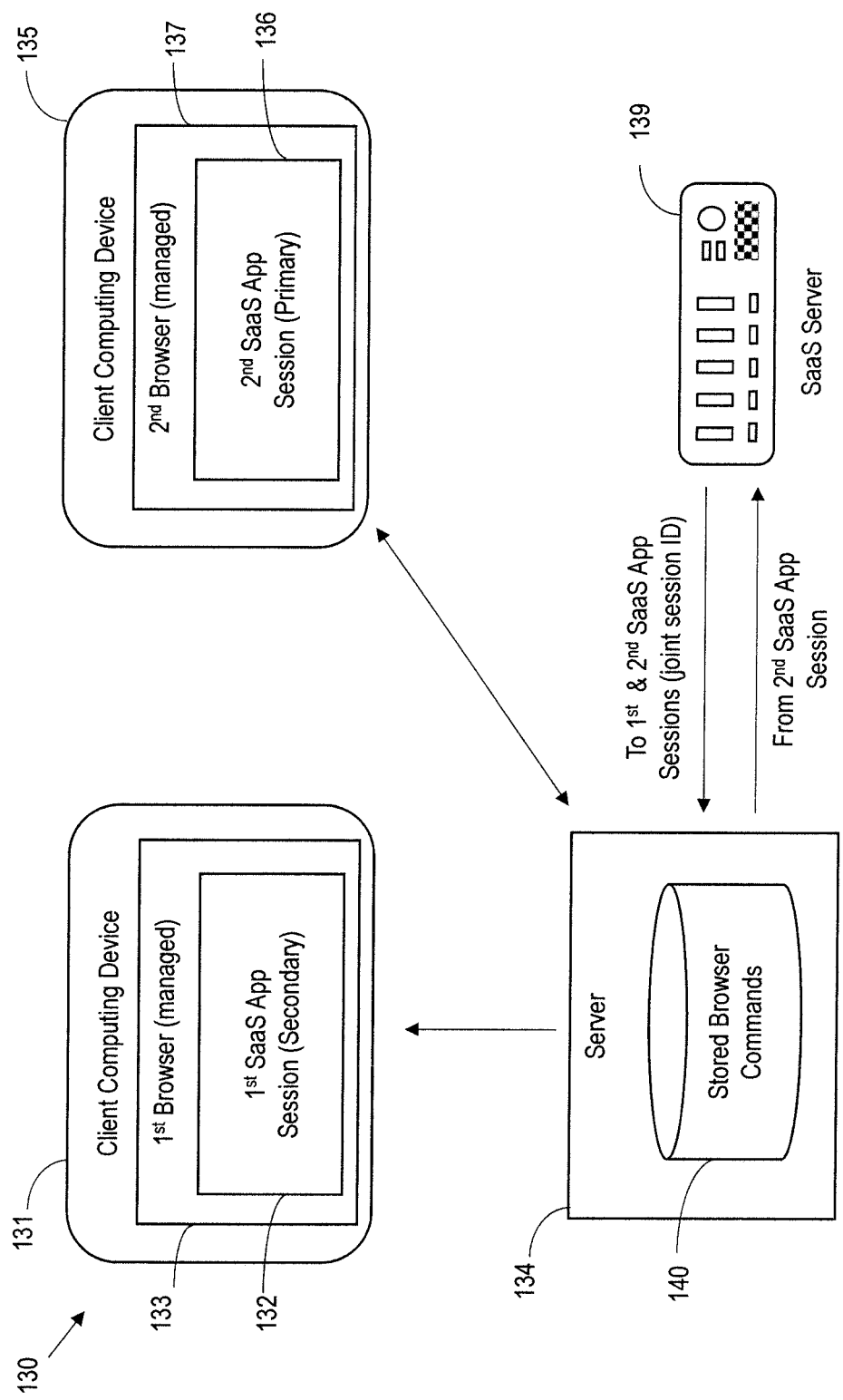
Figure 10:
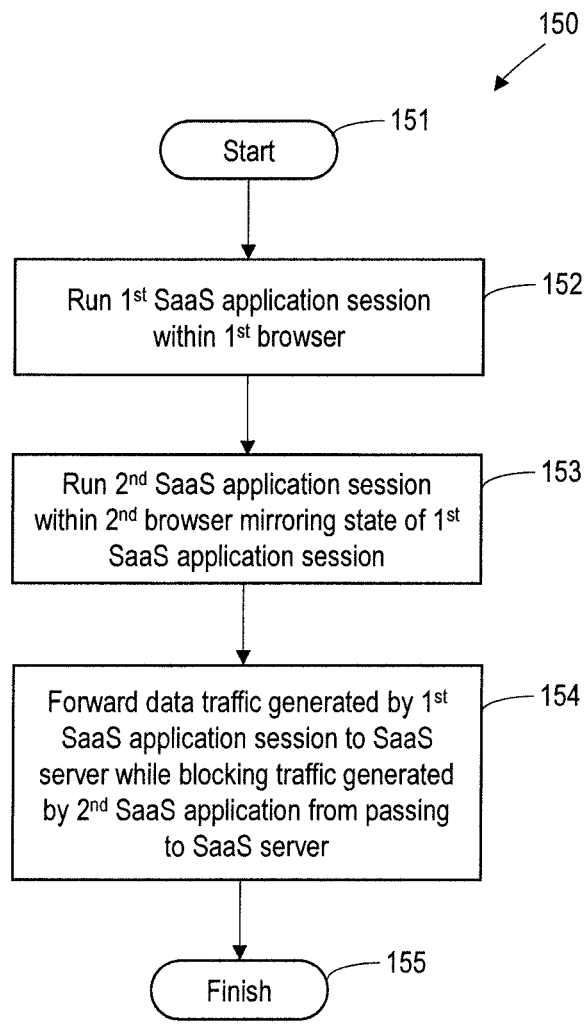
FIGS. 10 and 11 are flow diagrams illustrating example method aspects associated with the systems of FIGS. 7-9.

Turning now to example implementations of the computing system 130 shown in FIGS. 7-9 and the flow diagrams 150, 160 of FIG. 10, another approach is provided for running SaaS application sessions in parallel for purposes of fast-switching between browsers, e.g., to a different form factor (native, embedded/local, hosted/secure). The state recreation approach described above with reference to FIGS. 3-6B handles both SaaS application roaming cases and local-hosted transition cases. However, in some circumstances state recreation may take some time, e.g., when the recorded state becomes large over time, and accordingly may introduce delay in UX. The following approach allows for native-local-hosted transitions to happen substantially instantaneously.

Beginning at Block 151, the computer system 130 illustratively includes a client computing device 131 configured to run a first SaaS application session 132 from a SaaS service (represented as a SaaS server 139) within a first browser 133 (Block 152), as similarly described above. A server 134 (which may be similar to the server 34 discussed above) may cooperate with the client computing device 131 to run a second SaaS application session within a second browser mirroring a state of the first SaaS application session, at Block 153. As discussed above, the first browser 133 may be a local or embedded browser, for example, while the second browser may be a hosted browser (e.g., run in a virtual session by the server 134), or it may be a local or embedded browser run on another client computing device, as will be discussed further below. The second browser mirrors the first browser 133 in that the second browser runs in parallel to the first browser and executes the same browser commands that are being executed by the first browser. That is, the browser commands are captured by the first browser 133, as discussed above, and then communicated to the server 134 to be executed in the same sequence as, and in substantially real-time with, the first browser.

However, a potential problem that exists with running the second browser in parallel with the first browser 133 is that of duplicate outbound traffic being generated by the second browser. For example, if a payment transaction is being performed within the first SaaS application session, mirroring that same payment transaction in the second SaaS application session could undesirably result in a double payment by the user. As such, the server 134 advantageously forwards data traffic generated by the first SaaS application session 132 to the SaaS server 139 while blocking traffic generated by the second SaaS application from passing to the SaaS server, at Block 154, which illustratively concludes the method of FIG. 10 (Block 155).

In accordance with one example implementation, user actions are played in parallel and asynchronously to both the first and second browsers through a secure pairing of the user input injection as part of a "joint session". More particularly, network traffic from both the first and second browsers 133, 137 is tagged as belonging to a joint session identifier (ID). A proxy (e.g., Citrix Secure Gateway) would ordinarily channel all traffic from both first and second browser instances to the backend SaaS application service. Yet, in the case of a joint session with a second browser operating in parallel, the proxy (here the server 134) lets traffic from the first browser 133 pass to the SaaS server 139, but blocks traffic from the second browser 137, e.g., so that a transaction will not be executed twice, etc. However, the responses from the SaaS application server 139 are multiplexed/duplicated by the proxy server 134 and delivered to both of the first and second browsers 133, 137.

Figure 11:
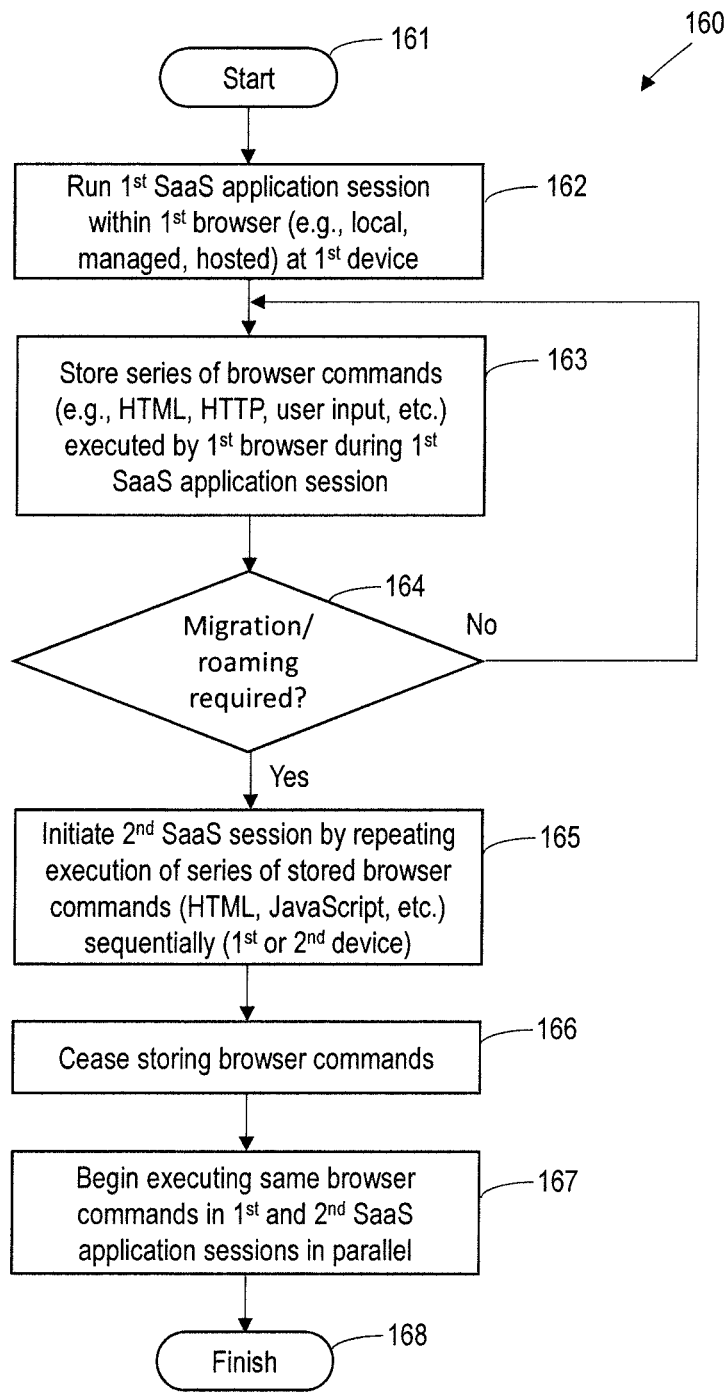

The foregoing will be further understood with reference to the examples of FIGS. 8 and 9, and with reference to the flow diagram 160 of FIG. 11. Beginning at Block 161, the client computing device 131 is a first client computing device running the first SaaS application session 132 within the first browser 133 (Block 162), and a second client computing device 135 cooperates with the server 134 to run a second SaaS application session 136 within a second browser 137. Moreover, the first SaaS application session 132 is the primary session at the time shown in FIG. 8, and the second SaaS application session 136 is the secondary session, meaning that it will be mirroring or shadowing the primary session in parallel as noted above. Also in this example, the user of the first client computing device 131 wants to transition or roam to the second client computing device 135, such as by transitioning from a mobile device (e.g., a smartphone or tablet computer) to a laptop or desktop computer, for example, or vice-versa. However, roaming may occur as between other combinations of client devices in different embodiments.

In this example, the server 134 stores a series of browser commands executed by the first browser 133 in the first SaaS application session 132, as described above with reference to FIGS. 3-6A, such as in a database 140, at Block 163. The server 134 initiates the second SaaS application session 136 within the second browser 137 based upon the stored series of browser commands to replicate the state of the first SaaS application session 132. This approach may accordingly be considered a hybrid between the approach discussed above with respect to FIG. 3, and the mirrored approach discussed with reference to FIG. 7. That is, the second SaaS application session 136 is initially established based upon the browser command history (e.g., executing the commands in sequential order) of the first SaaS application session 132 when migration or roaming is required (Blocks 164-165).

Thereafter, the second SaaS application session 136 begins to mirror the browser commands of the first SaaS application session 132 to maintain the same state in the second SaaS application session as the first SaaS application session, and the server 134 may optionally cease storing the browser commands from the first SaaS application session, if desired (Blocks 166-167), for example, which illustratively concludes the method of FIG. 11 (Block 168). Moreover, after the second SaaS application session 136 is running, it may become the primary session, such as if the user transitions over to the second client computing device 135 and is no longer using the first client computing device 131, and the first SaaS application session then becomes the secondary (mirrored) session.

As such, the hybrid approach starts with the state-recording and state-recreation approach, and then transitions into the parallel-state approach. In accordance with one example use case, a user launches the first SaaS application session 132 on the first client computing device 131 (e.g., a tablet computer) in the first browser 133. The server 134 cooperates with the first client computing device 131 to begin the SaaS application state recording via browser commands. The user subsequently approaches the second client computing device 135, e.g., his or her desktop, a Workspace Hub (WSH) or another sharing/kiosk device. Based on proximity detection (e.g., a beacon), for example, the first client computing device 131 silently pairs with the second client computing device 135 and instructs it to start SaaS application state-recreation in the second browser 137. However, at this point the second SaaS application session 136 is not shown on the second client computing device 135, as it is operating in a silent/invisible mode.

Once the state is recreated, the first client computing device 131 starts the parallel-state approach with the second client computing device 135 via the server 134. As the user approaches further/arrives, the user decides to switch over or cast to the second client computing device 135, e.g., the WSH and its larger monitor. At this point, the second SaaS application session or instance 136 on the second client computing device 135 is presented/revealed, resulting in an effectively instantaneous transition (fast switching) from the first client computing device 131 to the second client computing device 135. Moreover, the second client computing device 135 becomes the primary device, while the first client computing device 131 becomes the secondary device. The first SaaS application session 132 on the first client computing device 131 may then be hidden.

The parallel-state method may continue as long as the first and second client computing devices 131, 135 are paired. However, at some point the first client computing device 131 may stop operating the shadow or secondary SaaS application session, e.g., if the second client computing device 135 remains an actively used desktop while the first client computing device is unpaired due to increased distance, etc. A benefit of this hybrid approach is that it helps to ensure a fast SaaS application session transition between client computing devices that may not be paired from the very start of the first SaaS application session 132, but may become paired or roamed/cast to upon demand. In other words, the second client computing device 135 may be "primed" in advance, then kept ready for anticipated fast switching at the appropriate time.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computer system comprising:
   a client computing device configured to run a first Software as a Service (SaaS) application session from a first server within a first browser; and
   a second server cooperating with the at least one client computing device to
      run a second SaaS application session within a second browser mirroring a state of the first SaaS application session, and
      forward data traffic generated by the first SaaS application session to the first server while blocking traffic generated by the second SaaS application session from passing to the first server, and delivering responses from the first server to the data traffic from the first SaaS application session to both of the first and second SaaS application sessions.

2. The computer system of claim 1 wherein the client computing device comprises a first client computing device running the first SaaS application session within the first browser, and further comprising a second client computing device different than the first client computing device cooperating with the second server to run the second SaaS application within the second browser.

3. The computer system of claim 1 wherein the second server is further configured to store a series of browser commands executed by the first browser in the first SaaS application session, and initiate the second SaaS application session within the second browser based upon the stored series of browser commands to replicate the state of the first SaaS application session.

4. The computer system of claim 3 wherein the second server is further configured to cease storing browser commands executed by the first browser once the second SaaS application session has been initiated, and begin executing the same browser commands as the first SaaS application session in parallel in the second SaaS application session to maintain the same state in the second SaaS application session as the first SaaS application session.

5. The computer system of claim 3 wherein the second server causes the second browser to repeat execution of the series of stored browser commands sequentially to initiate the second SaaS application session.

6. The computer system of claim 1 wherein the second server is configured to designate network traffic from the first and second browsers with a joint session identifier (ID).

7. The computer system of claim 1 wherein at least one of the first and second browsers comprises an embedded browser.

8. The computer system of claim 1 wherein at least one of the first and second browsers comprises a hosted browser.

9. A method comprising:
  running a first Software as a Service (SaaS) application session from a first server within a first browser at a client computing device; and
  using a second server to run a second SaaS application session within a second browser mirroring a state of the first SaaS application session, forward data traffic generated by the first SaaS application session to the SaaS server while blocking traffic generated by the second SaaS application session from passing to the SaaS server, and deliver responses from the first server to the data traffic from the first SaaS application session to both of the first and second SaaS application sessions.

10. The method of claim 9 wherein the client computing device comprises a first client computing device running the first SaaS application session within the first browser, and further comprising using the second server in cooperation with a second client computing device different than the first client computing device to run the second SaaS application within the second browser.

11. The method of claim 9 further comprising using the second server to store a series of browser commands executed by the first browser in the first SaaS application session, and initiate the second SaaS application session within the second browser based upon the stored series of browser commands to replicate the state of the first SaaS application session.

12. The method of claim 11 further comprising using the second server to cease storing browser commands executed by the first browser once the second SaaS application session has been initiated, and begin executing the same browser commands as the first SaaS application session in parallel in the second SaaS application session to maintain the same state in the second SaaS application session as the first SaaS application session.

13. The method of claim 11 wherein the second server causes the second browser to repeat execution of the series of stored browser commands sequentially to initiate the second SaaS application session.

14. The method of claim 11 further comprising using the second server to designate network traffic from the first and second browsers with a joint session identifier (ID).

15. A non-transitory computer-readable medium having computer-executable steps for causing a processor to perform steps comprising:
  cooperating with a client computing device to run a first Software as a Service (SaaS) application session from a SaaS server within a first browser at a client computing device;
  running a second SaaS application session within a second browser mirroring a state of the first SaaS application session; and
  forwarding data traffic generated by the first SaaS application session to the SaaS server while blocking traffic generated by the second SaaS application session from passing to the SaaS server, and delivering responses from the first server to the data traffic from the first SaaS application session to both of the first and second SaaS application sessions.

16. The non-transitory computer-readable medium of claim 15 wherein the client computing device comprises a first client computing device running the first SaaS application session within the first browser, and further having computer-executable instructions for causing the processor to cooperate with a second client computing device different than the first client computing device to run the second SaaS application within the second browser.

17. The non-transitory computer-readable medium of claim 15 further having computer-executable instructions for causing the processor to store a series of browser commands executed by the first browser in the first SaaS application session, and initiate the second SaaS application session within the second browser based upon the stored series of browser commands to replicate the state of the first SaaS application session.

18. The non-transitory computer-readable medium of claim 16 further having computer-executable instructions for causing the processor to cease storing browser commands executed by the first browser once the second SaaS application session has been initiated, and begin executing the same browser commands as the first SaaS application session in parallel in the second SaaS application session to maintain the same state in the second SaaS application session as the first SaaS application session.

19. The non-transitory computer-readable medium of claim 16 further having computer-executable instructions for causing the processor to cooperate with the second browser to repeat execution of the series of stored browser commands sequentially to initiate the second SaaS application session.

20. The non-transitory computer-readable medium of claim 15 further having computer-executable instructions for causing the processor to designate network traffic from the first and second browsers with a joint session identifier (ID).

* * * * *